(12) United States Patent
Jackson et al.

(10) Patent No.: US 6,912,515 B2
(45) Date of Patent: Jun. 28, 2005

(54) METHOD AND SYSTEM FOR ALGORITHM SYNTHESIS IN PROBLEM SOLVING

(75) Inventors: Warren B. Jackson, San Francisco, CA (US); Markus P. J. Fromherz, Palo Alto, CA (US)

(73) Assignee: Xerox Corporation, Stamford, CT (US)

( * ) Notice: Subject to any disclaimer, the term of this patent is extended or adjusted under 35 U.S.C. 154(b) by 508 days.

(21) Appl. No.: 09/874,552

(22) Filed: Jun. 4, 2001

(65) Prior Publication Data

US 2002/0184166 A1 Dec. 5, 2002

(51) Int. Cl.[7] .............................. G06E 1/00; G06F 15/18
(52) U.S. Cl. .............................. 706/19; 706/12; 706/14
(58) Field of Search .............................. 706/19, 12–15, 706/902

(56) References Cited

U.S. PATENT DOCUMENTS

| | | | | |
|---|---|---|---|---|
| 4,829,426 A | * | 5/1989 | Burt ............................ | 706/45 |
| 5,140,530 A | * | 8/1992 | Guha et al. ................... | 706/13 |
| 5,517,654 A | * | 5/1996 | Kimbel et al. ................. | 712/30 |
| 5,678,002 A | * | 10/1997 | Fawcett et al. ............... | 345/709 |
| 5,864,833 A | * | 1/1999 | Schaffer et al. ................ | 706/13 |
| 5,870,731 A | * | 2/1999 | Trif et al. ...................... | 406/52 |
| 5,871,731 A | * | 2/1999 | Sprotte et al. ............ | 424/130.1 |
| 6,014,658 A | * | 1/2000 | Pretz ............................ | 707/2 |
| 6,044,344 A | * | 3/2000 | Kanevsky ..................... | 704/256 |
| 6,088,690 A | * | 7/2000 | Gounares et al. .............. | 706/13 |
| 6,119,111 A | * | 9/2000 | Gross et al. ................... | 706/15 |
| 6,144,953 A | * | 11/2000 | Sorrells et al. ................ | 706/60 |
| 6,219,066 B1 | * | 4/2001 | Kurtzberg et al. .......... | 345/440 |
| 6,226,620 B1 | * | 5/2001 | Oon .............................. | 705/2 |
| 6,233,572 B1 | * | 5/2001 | Crawford et al. .............. | 707/3 |
| 6,269,351 B1 | * | 7/2001 | Black ........................... | 706/15 |
| 2002/0184176 A1 | * | 12/2002 | Fromherz et al. ............. | 706/45 |
| 2003/0100344 A1 | * | 5/2003 | Garmonev et al. ......... | 455/562 |

FOREIGN PATENT DOCUMENTS

WO          WO 9962018 A1 * 12/1999          ........... G06F/17/60

OTHER PUBLICATIONS

Borrett et al; Adaptive Constraint Satisfaction: The Quickest First Principle; Nov. 13, 1995, pp 1–25.*
In re Harza, 274 F.2d 669, 671, 124 USPQ 378, 380 (CCPA 1960).*
Minton et al; Using Machine Learning to Synthesize Search Programs; Ninth Knowledge Based Software Engineering Conference Proceedings; Sep. 20–23, 1994; pp 31–38.*
Lau et al; Solving large Processor Configuration Problems with the Guided Genetic Algorithm; Tenth IEEE International Conference on Tools with Artificial Intelligence Proceedings; Nov. 10–12, 1998; pp 320–327.*

(Continued)

*Primary Examiner*—Anthony Knight
*Assistant Examiner*—Meltin Bell
(74) *Attorney, Agent, or Firm*—Linda M. Robb

(57) ABSTRACT

A method for problem solving in a computer system includes an applications module for sending a problem statement to a complexity module, which configures a solving module with configuration parameters and also determines expected problem solver behavior. The solving module selects a set of parameter configuration vectors, determines a set of search space points, performs a partial search based on the parameter configuration vectors, and determines actual problem solver behavior. The solving module then determines whether a problem solution has been found, whether to perform a solver iteration step or request a complexity module to perform an adaptation step.

40 Claims, 8 Drawing Sheets

OTHER PUBLICATIONS

Lau et al; The Guided Genetic Algorithm and its application to the Generalized Assignment Problem; Tenth IEEE International Conference on Tools with Artificial Intelligence Proceedings; Nov. 10–12, 1998; pp 336–343.*

Lau et al; Applying a Mutation–Based Genetic Algorithm to Processor Configuration Problems; Proceedings Eighth IEEE International Conference on Tools with Artificial Intelligence; Nov. 16–19, 1996; pp 17–24.*

Wang et al; Solving Constraint Satisfaction Problems Using Neural Networks; Second International Conference on Artificial Neural Networks; Nov. 18–20, 1991; pp 295–299.*

Jackson et al; A Hybrid Heirarchical Control Architecture for Paper Transport Systems; Proceedings of the 37th IEEE Conference on Decision and Control; vol. 4; Dec. 16–18, 1998; pp 4294–4295.*

James E. Borrett, Edward P.K. Tsang and Natasha R. Walsh, Adaptive Constraint Satisfaction. The Quickest First Principle, Nov. 13, 1995, pp 1–25.*

John A. Allen and Steven Minton, "Selecting the Right Heuristic Algorithm: Runtime Performance Predictors", Proceedings of the Artificial Intelligence Conference, Toronto, Canada, May 1966, pp. 41–53.

* cited by examiner

METHOD AND SYSTEM FOR ALGORITHM SYNTHESIS IN PROBLEM SOLVING

CROSS REFERENCE TO RELATED APPLICATIONS

U.S. Pat. No. 6,865,562, filed Jun. 6, 2001, titled "Adaptive Constraint Problem Solving Method and System", is assigned to the same assignee of the present application. The entire disclosure of this patent is totally incorporated herein by reference in its entirety.

INCORPORATION BY REFERENCE

The following U.S. patents are fully incorporated herein by reference: U.S. Pat. No. 5,870,731 (Trif et al., "Adaptive Problem Solving Method and System"); U.S. Pat. No. 6,088,690 (Gounares et al., "Method and Apparatus for Adaptively Solving Sequential Problems in a Target System Utilizing Evolutionary Computation Techniques"); and U.S. Pat. No. 6,144,953 (Sorrells et al., "Time-Constrained Inference Strategy for Real-Time Expert Systems").

BACKGROUND OF THE INVENTION

This invention relates generally to the field of computerized problem solving and in particular to a system and method utilizing an adaptive constraint solver for the solution of complex problems in real time, based on predictive complexity models and interleaving of different problem solving algorithms.

In certain control system applications, there exists a significant need for systems which can provide satisfactory decisions in critically time-constrained situations for complex systems having subsystems consisting of many networked sensors and actuators, with each subsystem having control, monitoring and fault diagnosis capabilities. Advances in hardware technology, such as inexpensive processors, low-cost micro-electromechanical systems (MEMS) actuators and sensors, and decreasing communication costs, result in systems with unprecedented reconfigurability, flexibility, and robustness. However, networked embedded applications require decision system technology that combines distributed constraint optimization methods with complexity analysis and learning techniques.

Decision systems for such applications have not kept pace with hardware development. Traditionally, decision systems have utilized model-based computer programs using generic constraint solving (finding a solution to a constraint problem) techniques executed on a single, high-end processor. For example, a simple constraint problem is "determining a roller velocity (desired solution) such that a sheet in a printing system arrives at the next registration station at the desired time (the objective) and the velocity does not exceed the roller's velocity limit (constraint)." An example of distributed embedded software is control software, such as software that controls a machine's functions and runs on multiple networked processors within a machine, instead of a single PC or work station. Embedded applications, such as machine control, usually deal with complex constraint problems that have to be solved within tight real-time constraints, while embedded processors usually have strong resource limitations, such as a slow central processing unit with limited memory.

Constrained optimization is at the core of many embedded applications. In applications such as planning, scheduling, control, and diagnosis, it is necessary to generate timely and accurate solutions such as operational plans, control inputs, fault hypotheses, and recovery actions. The common task in these applications is to repeatedly find a solution for a given objective, a solution that is achievable within or consistent with the system's constraints. Today, such applications are typically hand-coded programs based on an extensive analysis of a fixed configuration and task of the system. However, in order to provide dynamic reconfiguration and fault-tolerant behavior for future networked embedded systems, many synthesis operations must become part of the software's real-time operations, as is often the case in military applications. Although the problem solver described herein is not limited to military applications, the following discussion will pertain to a military situation for purposes of example only.

For example, military hardware often outlasts the usefulness of its technology. To address this issue, it is desirable to upgrade and repurpose existing systems for new tasks instead of investing in new hardware. An unmanned underwater vehicle, for example, is potentially a multi-purpose undersea platform for weapons deployment, reconnaissance missions, mine sweeping, rescue operations, etc. However, upgrading or repurposing such a vessel with new types of subsystems (weapons, sensors, mine-clearing or rescue equipment) is difficult, as the software has to coordinate and control interactions that are strongly dependent on the type, role, and original configuration of the equipment. Detecting and catching a mine, for example, requires taking into account the constraints of sensors, robotic arms, and propulsion, and the resulting constraint problems can be complex. The constraint problem to be solved repeatedly by the robot controller, for instance, may involve hundreds of nonlinear range, torque, and collision constraints for a modular manipulator, with multiple objectives such as reaching the target while conserving energy and minimizing motor noise. Today, such problems cannot be solved in real-time by existing techniques on embedded processors.

The second example is coordination of a large number of distributed embedded subsystems. For instance, the increasing number of hydrophonic sensors (on the order of 30,000 in a missile launcher-class submarine) used by sonars like Flank Arrays involves complex parallel architectures. Dynamically mapping and optimally reconfiguring huge data arrays, intensive workload, and data flows are known to be highly compute-intensive problems. Solutions must fit spatial constraints like processing units, memory organization and size, communication bandwidth, and data/computation locality, as well as temporal properties such as response times and latencies.

A final example is the distributed, fault-tolerant coordination of multiple vehicles. There are many applications that require the use of on-board solving services, from mission planning to optimal vehicle control. For instance, consider a set of aircraft formations autonomously performing a long-term mission behind the forward-edge battle area. Each formation leader performs the tactical (long-range) commanding of the formation, satisfying interoperability and coordination constraints, while all aircraft perform short-term self-control. Today, tasks such as planning, scheduling, and coordination are essentially performed before the mission. They consist of the generation of position-time trajectories according to mission objectives, specific navigation points, hostile and tactical environment constraints, and data correlation requirements. By solving these tasks dynamically and reactively to environment changes and mission updates, again using model-based techniques, the formation's availability and flexibility could be increased dramatically. This requires that the solvers distributed among the vehicles have the capability to adapt to a variety of objectives (mission goal, rules of engagement, detection avoidance, aircraft interaction, etc.), and that they are able to reconfigure themselves if individual aircraft exhibit reduced capabilities or even are disabled under enemy fire.

One approach that may provide a solution for generating robust reconfigurable software is model-based computing, which involves the explicit representation of and reasoning about a system's capabilities, constraints, and objectives at run-time. Because the system model is separated from task-specific algorithms, it can be changed as the system changes, making applications configuration-independent and fault-tolerant. Employing model-based computing on embedded software networks requires constraint solvers specifically optimized for such networks. The constraint problems to be solved arise from physical systems and thus almost always are large, hybrid, and nonlinear. No single solver algorithm can be expected to be suited for all problems. Instead, solvers have to be able to determine the characteristics of a problem and adapt accordingly. Moreover, solvers have to be able to scale to large problems, which typically means approximating or decomposing problems into subproblems.

Applications running on networked embedded systems present constraint solvers with complex constraint problems that cannot be anticipated off-line. At the same time, constraint solvers must execute within stringent resource limitations in an inherently distributed computing environment. Resorting to anytime algorithms to address real-time requirements, for example, is not sufficient to provide acceptable time-bounded solutions. Real-time application software requires on-line, time-bounded solver execution on processor networks with limited computational capabilities, memory, and communication bandwidth. The solvers must conserve resources and proactively allocate their tasks in a way that effectively utilizes the distributed resources of an embedded network within the allotted time. As a service, a solver should also be both application-independent and customizable to the environment. Thus, there is a need for an approach in which constraint solvers are capable of analyzing, learning from, and ultimately adapting to the presented problems.

There have been various approaches in problem solving techniques, such as U.S. Pat. No. 5,870,731 to Trif et al. titled "Adaptive Problem Solving Method and System," which teaches a problem solving method including retrieving a question from a storage device, outputting the question to an output device, receiving an answer from the user, assigning a fuzzy logic coefficient to the answer, and accessing a learning route authority from the storage device to determine the identity of a subsequent question. Answers to questions are learned through user-provided evaluations in a system that is not designed for real-time use.

U.S. Pat. No. 6,088,690 to Gounares et al. titled "Method and Apparatus for Adaptively Solving Sequential Problems in a Target System Utilizing Evolutionary Computation Techniques" discloses a system in which chromosomes are applied to a target system one action at a time and the change in properties of the target system is measured after each action is applied. A fitness rating is calculated for each chromosome based on the property changes produced in the target system by the chromosome. The fitness rating calculation is defined so that successive generations of chromosomes will converge upon desired characteristics. This approach is not based on problem analysis and again is not for real-time use.

Finally, U.S. Pat. No. 6,144,953 to Sorrells et al. titled "Time-Constrained Inference Strategy for Real-Time Expert Systems" teaches a control process and an inference network which assign merit values to each inference node of the inference network. The merit values reflect the processing cost of expanding a node to calculate a likelihood value for the proposition that the node represents. The merit values are then used in the control process to determine which of the nodes will be processed first to calculate likelihood values. This establishes a "best-first" control process which takes account of the processing cost of each node in the inference network to determine which nodes to evaluate first. However, this approach does not provide the capability of learning from, analyzing and adapting to presented problems.

SUMMARY OF THE INVENTION

Briefly stated, and in accordance with one aspect of the present invention, there is presented a method for problem solving for use in a computer system. The method includes an applications module for sending a problem statement containing data associated with a plurality of system operational variables, a plurality of system constraints, and a plurality of task goals to a complexity module. The complexity module configures a solving module with configuration parameters and also determines expected problem solver behavior. The solving module selects a set of configuration parameter vectors, determines a set of search space points, performs a partial search based on the configuration parameter vectors, and determines actual problem solver behavior. The solving module then determines whether a problem solution has been found, and determines whether to perform a solver iteration step or to request a complexity module to perform an adaptation step. If a solver iteration step is selected, a new actual problem solver behavior is determined. When an adaptation step is selected, the complexity module modifies the configuration parameters, configures the solving module with the modified configuration parameters, and determines expected problem solver behavior. The iteration and adaptation steps are repeated until a problem solution is found.

In another form, the invention comprises a computer system for problem solving, including an input device, an output means, a control computer, and a memory portion coupled to the control computer. The memory portion includes software modules for receiving information as to the primary goal for the task to be performed, for identifying system configuration parameters and system secondary goals, and for configuring a problem statement and a problem solver. The problem statement includes the primary goal, secondary goals, system configuration parameters, data associated with a plurality of system operational variables, and data associated with the status of implementation units communicating with the computer system. The memory portion also includes software for determining configuration parameter vectors, determining expected problem solver behavior, determining actual problem solver behavior, and determining whether a solution has been found as well as determining whether to perform a solver iteration step or an adaptation step and performing solver iteration steps and adaptation steps.

In yet another embodiment the system comprises a computer system for problem solving including an input device, a control computer coupled to the output of the input device, and a memory portion coupled to the control computer. The memory portion includes a complexity module for configuring a problem statement, a synthesis module for determining configuration parameter vectors, and a controllable solving module for calculating actual problem solver behavior. The memory portion also includes a comparison module for comparing actual problem solver behavior with expected problem solver behavior. Output means provide a statement of deviation of actual problem solver behavior from problem solver goal behavior.

In another form the problem solver within the computer system comprises means for receiving a problem statement having primary task goals, secondary task goals, configuration parameters for the computer system, data associated with a plurality of system operational variables, and data associated with the status of implementation units communicating with the computer system. The problem solver also includes means for determining expected problem solver behavior associated with the problem statement, means for providing configuration parameters for a plurality of problems, means for determining a set of configuration parameter vectors, means for calculating actual problem solver behavior, and means for reviewing actual problem solver behavior to determine if a problem solution has been found. Also present are means for determining whether to perform a solver iteration step or an adaptation step, means for performing solver iteration and adaptation steps, and means for comparing actual problem solver behavior with expected problem solver behavior. When a problem solution has been found, means are present to provide the solution to an output device.

In another embodiment, a problem solving method for use in a computer system comprises receiving a problem statement having data associated with a plurality of system operational variables and a plurality of system constraints and configuring the problem statement and a problem solver with configuration parameters. The method determines expected problem solver behavior associated with the configuration parameters, determines a set of configuration parameter vectors, and determines actual problem solver behavior. Actual problem solver behavior is reviewed to determine if a problem solution has been found and determine whether to perform a solving iteration step or an adaptation step if a problem solution has not been found. A solver iteration step is performed until an adaptation step is selected. When an adaptation step is selected actual problem solver behavior and expected problem solver behavior are compared and the configuration parameters are modified, a new expected problem solver behavior is determined, a revised actual problem solver behavior is predicted, and the revised actual problem solver behavior is reviewed to determine if a problem solution has been found. The adaptation step is repeated until a problem solution is found and a solution statement is transmitted.

In another form, the problem solver is stored via storage media, with the storage media having a first plurality of binary values for receiving a problem statement transmission and storing the problem statement in a first data format. A second plurality of binary values transforms the first data format to a second data format. A third plurality of binary values determines expected problem solver behavior associated with the second data format. A fourth plurality of binary values selects a set of configuration parameter vectors. A fifth plurality of binary values determines actual problem solver behavior associated with the second data format. A sixth plurality of binary values determines if a problem solution has been found. A seventh plurality of binary values determines whether to perform a solver iteration step or perform an adaptation step if a problem solution has not been found. An eighth plurality of binary values compares the expected problem solver behavior and the actual problem solver behavior. A ninth plurality of binary values performs a solver iteration step. A tenth plurality of binary values performs a solver adaptation step. An eleventh plurality of binary values transmits a solution statement in a third data format.

BRIEF DESCRIPTION OF THE DRAWINGS

The foregoing and other features of the problem solver will be apparent and easily understood from a further reading of the specification, claims and by reference to the accompanying drawings in which:

DETAILED DESCRIPTION OF THE INVENTION

Figure 1:
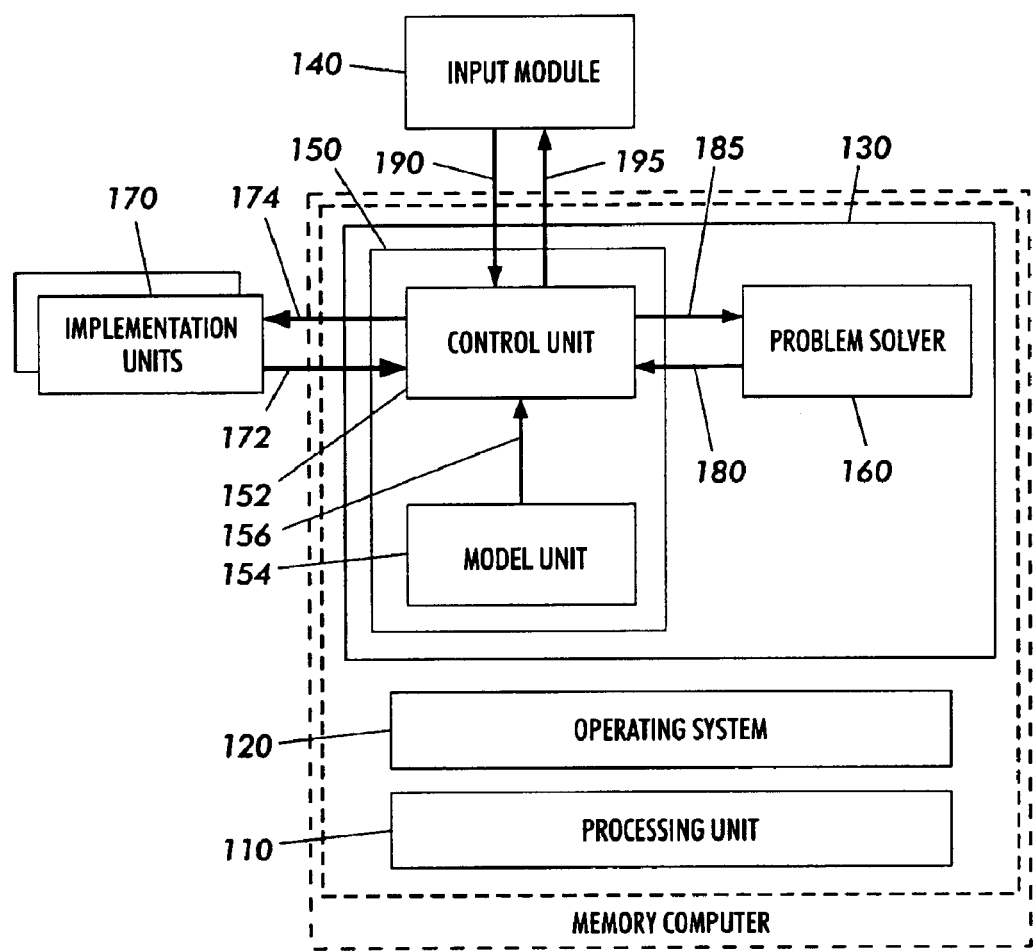
FIG. 1 is a schematic of a representative system incorporating the problem solving method.

A few research groups have developed adaptive constraint solving approaches. These can be divided into off-line methods that learn the best configuration for a given set of problems and on-line methods for switching between search algorithms in response to poor solver performance. In the off-line learning approach, the learning program is given a solver algorithm, a set of heuristics, a set of problems, and a performance objective function, and it generates a solver configuration (algorithm and heuristics) that performs optimally on the problem set according to the objective. A typical version of on-line adaptation is the algorithm portfolio approach. In one example, the solver has a set of algorithms available that it tries in a fixed order based on performance criteria such as thrashing, as described in J. Borrett, E. P. K. Tsang, and N. R. Walsh, "Adaptive Constraint Satisfaction: The Quickest First Principle," *Proc. ECAI'96*, Budapest, Hungary, 1996, pp. 160–164. In another example, the solver switches between different heuristics based on problem-independent performance characteristics that predict how each heuristic should do on a given problem (J. A. Allen and S. Minton, "Selecting the Right Heuristic Algorithm: Runtime Performance Predictors," *Proc. Canadian AI Conference*, 1996).

None of these approaches, however, look at characteristics of the problems they adapt to, and indeed they rely on problems in the given set to be relatively uniform relative to heuristics and performance metrics. As a consequence, they adapt to the average problem in the set, they cannot extrapolate to new problems, and they cannot adapt usefully to diverse problem sets or even multiple problem classes. Also, they are inefficient compared to hand-coding, become "trapped" and can't find appropriate solutions, and require operator intervention to achieve convergence to an appropriate solution. These are all properties that are significant for a generic constraint problem solving program. To provide an improved constraint problem solving program, the approach disclosed herein combines off-line and on-line analyses. In this approach, based on phase transition and related analyses, complexity models are generated that link problem characteristics to preferred solver configurations. Additionally, they predict the expected behavior when applying a solver configuration to a problem, which can be used to dynamically adapt the solver and to refine the complexity models if the solver's behavior diverges. This is achieved through analysis of constraint solver behavior in terms of problem-independent, universal parameters such as number of variables, number of constraints, complexity of objective function, complexity of individual constraints, and scaling laws. The problem solver described herein then models the behavior of solver and these parameters and uses this to guide the constraint solver in solving problems. This is then used for decomposition of problems into subproblems, determination of termination criteria, and selection between multiple solution paths.

Aside from the problems described above, existing problem solving approaches employ a single, parameterized algorithm or a portfolio of distinct, non-cooperating algorithms without interleaving and algorithm synthesis. A variety of different solvers exist for constrained optimization problems, each of which performs better on some types of problems than other types. No single algorithm is always preferred for all cases. Therefore, it is highly desirable to switch between algorithms in order to minimize the cost in solving the problem. Although it may be possible to have a portfolio of solvers, each working on the problem concurrently, providing a solution set from which a solution is selected, this approach is computer resource intensive. Also, even though a particular algorithm has performed poorly on a past solution, it is used again for the current solution. Alternatively, if a single algorithm is selected from a portfolio, the selected algorithm could be only marginally better than another. Because of the discontinuous switch in algorithms, a feedback algorithm trying to select algorithms would cause the computer to switch back and forth between algorithms, possibly yielding an oscillating solution. In such cases, the best algorithm is often a hybrid between two or more algorithms. Finally, another problem with using a portfolio of algorithms is the large amount of storage needed for all the different algorithms. The storage requirement is incompatible with the limited memory of many processors.

Although the adaptive constraint problem solver described herein is not limited to embedded applications, the following discussion will pertain to embedded systems for purposes of example only. One skilled in the art will appreciate that the adaptive constraint problem solver is useful for many complex control problems, generic software solutions to a wide variety of programming problems, flexible programs that separate the model from its solution, and wherever formulation as constraint problems is natural for expression of domain knowledge. Additionally, it may be practiced in a multitude of computing environments.

Various computing environments may incorporate a constraint problem solving program containing the algorithm synthesis module of the problem solver. The following discussion is intended to provide a brief, general description of suitable computing environments in which the problem solver may be implemented. Although not required, the problem solver will be described in the general context of computer-executable instructions, such as program modules, being executed by a networked computer. Generally, program modules include routines, programs, objects, components, data structures, etc. that perform particular tasks or implement particular abstract data types. Moreover, those skilled in the art will appreciate that the problem solver may be practiced with other computer system configurations, including handheld devices, multi-processor systems, microprocessor-based or programmable consumer electronics, networked PCs, minicomputers, mainframe computers, and the like. The problem solver may also be practiced in distributed computing environments where tasks are performed by remote processing devices that are linked through a communications network. In a distributed computing environment, program modules may be located in both local and remote memory storage devices.

FIG. 1 illustrates one example of how the constraint problem solving program interacts with selected modules of an embedded computer system that is an integral part of a larger computing system or machine. Embedded systems are used to control, monitor or assist an operation being performed by equipment interfacing with the computer system. Typically, an embedded system is housed on a microprocessor board with Read Only Memory (ROM) for storing the programs and Random Access Memory (RAM) for program execution data. Examples of devices utilizing embedded systems include printers, cameras, watches, microwave ovens, video cassette recorders, automobiles, airplanes, submarines and other vehicles, engineering tools, process control systems, and office and consumer products. Some embedded systems include an operating system, while others are so specialized that the entire logic can be implemented as a single program. Embedded systems may also be controlled by external software, as in a client/server environment. However, embedded systems present resource constraints, such as less memory and a slower processor, which limit their capabilities. The problem solver described herein is able to operate within these resource constraints and increase the functionality of the system by providing the capability of taking into account a wider array of objectives and constraints for the performance of tasks being directed by the system. It gives the system the flexibility of operating in real time with more complex system constraints than is possible with existing systems.

Numerous types of embedded systems exist which may utilize the various embodiments of the problem solver disclosed herein. One example is the transport of paper along a paper path in a copier or printer. This operation is typically performed by rollers impinging on sheets of paper moving on a paper path through the printer. The rollers are driven by motors, which are controlled by embedded control software which has a specific goal, such as turning on a specific motor at a specific speed at a specific time. This control software is often controlled by higher-level embedded control software. The higher-level control software determines when to turn on the motors for the rollers and at what speed to run them to control when a sheet should enter and leave a specific segment of the paper path. This determination is made through consideration of the motors' constraints, feedback from sensors providing information as to the actual location of the sheet, and reaction to faults, etc. The problem solver disclosed herein provides the capability for such a system to control the interaction and timing of the movement of the components along the paper path more effectively and efficiently.

Another example of an embedded system which benefits from the problem solver is the operation of an airplane, rocket, or spacecraft. These devices have multiple components, which operate cooperatively to control the motion of the vehicle. Typically, control software is provided goals such as timing for firing thrusters and the firing level in the case of a rocket or spacecraft, or how far to move a flap or rudder in the case of an airplane. That specific function embedded control software is controlled by higher-level embedded control software, which has the goal of moving the vehicle along a desired trajectory and from that of calculating what each thruster, flap, and rudder should contribute. To perform a turn, the level of a thruster on one side could be increased or a rudder may be moved or both. These calculations must take into consideration the constraints of the individual devices, such as the existing rudder position and minimum time required to change the position. In performing a turn, if a rudder is already moved to a maximum angle or too far from the required position, more force may be needed from a thruster. The problem solver disclosed herein provides an embedded software module with the capability of handling more complex system control problems within existing system processor and memory constraints.

A final example of an embedded software system that benefits from the use of the problem solver is the operation of an automobile engine. The firing of an automobile's spark plugs is controlled by software which optimizes the time when a spark plug should fire relative to the movement of the piston. The software is given a goal of firing at a certain periodic rate to drive the automobile at a desired speed, and it controls the spark plug firing, taking into account the dynamic constraints of the pistons.

Returning now to FIG. 1, it will be recognized that a computing environment may include various modules, such as a processing unit, system memory, a system bus coupling various system components to the processing unit, an input/output system, a hard disk drive, an optical disk drive, program modules, program data, monitor, various interfaces, peripheral output devices, and/or networked remote computers. However, for the purpose of clarity, FIG. 1 illustrates only those modules within the computing environment which interact with the constraint problem solving program. In particular, the constraint problem solving program resides within a computing module, which includes a processing unit 110, operating system 120, applications module 130 and memory module. The memory module may be comprised of one or more of disk storage, tape storage, magnetic media, non-volatile memory, EPROM memory, EEPROM memory, FLASH memory, DRAM memory, SRAM memory, ROM, CD memory, computer memory, and/or any like memory system or device. Applications module 130 may perform many possible tasks, such as configuration management, coordination (directing the interaction of multiple hardware components), planning, scheduling, predictive observer (monitoring a hardware component, extrapolating future behavior from past behavior, and outputting the predicted behavior), system control, and diagnostics. The embodiments of the applications module described herein are exemplary only and do not limit the function of the applications module to those specific tasks.

In this embodiment, applications module 130 includes controller module 150 and adaptive constraint problem solver program 160. Within controller module 150 resides control unit 152, which communicates with model unit 154 through path 156. Path 156 provides control unit 152 with instructions concerning the constraints, such as hardware constraints, within the system and secondary goals for the task to be performed, for example conserving energy or maintaining moving parts at a constant velocity. Control unit 152 communicates with input module 140 through input path 190 and output path 195. Input path 190 provides control unit 152 with instructions as to the primary goal or goals of a task to be performed, for example moving a sheet of paper within a specified time frame or coordinating the movement of vehicles geographically. Output path 195 provides input module 140 with feedback as to an error in the execution of the task, such as when the goal or goals could not be achieved. The error specifies the deviation of the actual state or behavior from the goal state or behavior.

The adaptive constraint problem solver program 160 is interconnected to controller module 150 through control paths 180 and 185. Control path 185 provides adaptive constraint problem solver program 160 with the goals and constraints to be imposed on the system and information on the current state of the implementation units. Control path 180 provides control unit 152 with the solution for the problem presented. Control unit 152 is interconnected to various implementation units 170 through sensor path 172 and control path 174. Sensor path 172 provides the controller with information as to the current state of implementation units 170. Control path 174 provides a control signal to implementation units 170 after receipt of the problem solution from adaptive constraint problem solver 160. Additionally, input module 140 may be connected to model unit 154 through an additional input path, not shown, to provide the capability to modify the constraints or secondary goal input from model unit 154 to control unit 152.

Figure 2:
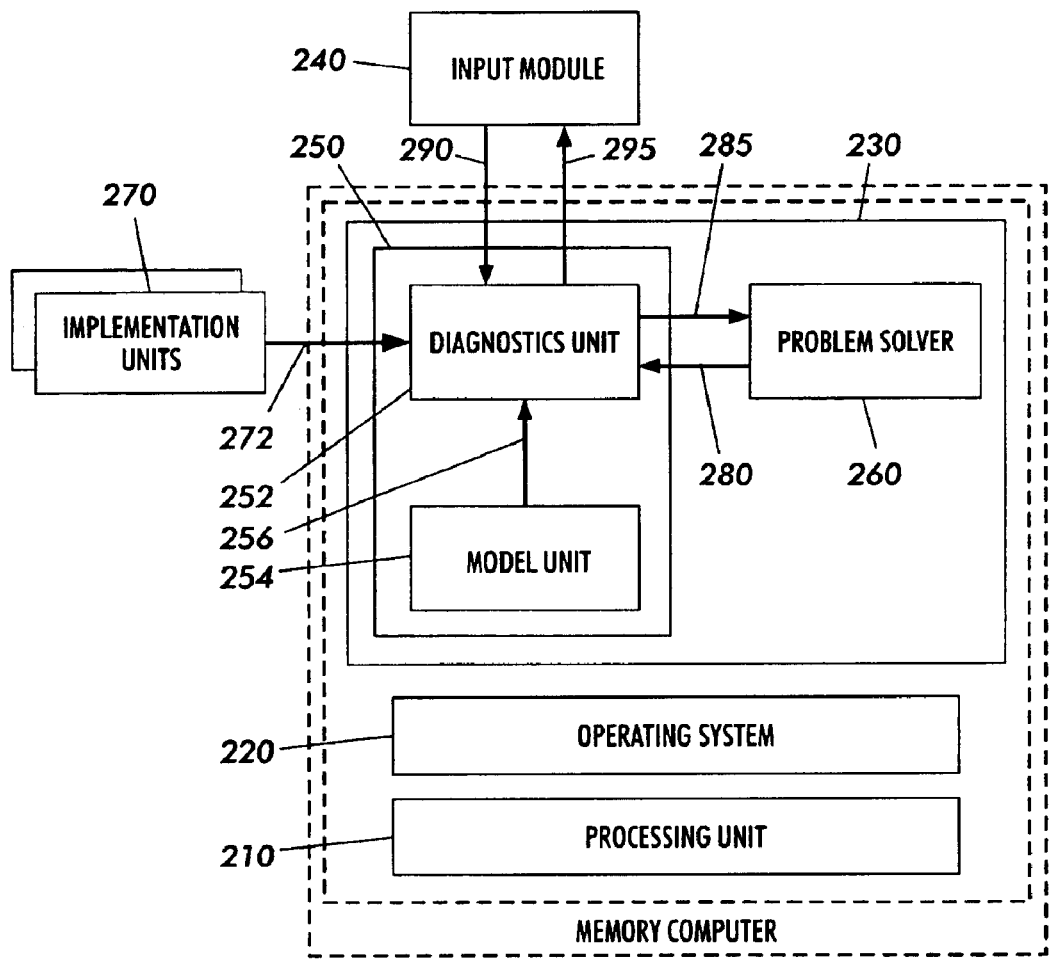
FIG. 2 is a schematic of another representative system incorporating the problem solving method.

Referring now to FIG. 2, there is shown a second example of how the adaptive constraint problem solver program interacts with modules of a general purpose computing system. Again, for the purpose of clarity, FIG. 2 illustrates only those modules within the computing environment which interact with the constraint problem solving program. Other modules such as those described above may be part of the system. The constraint problem solving program resides within a computing module, which includes a processing unit 210, operating system 220, and applications module 230. In this embodiment, applications module 230 includes diagnostics module 250 and adaptive constraint problem solver program 260. Within diagnostics module 250 resides diagnostics unit 252, which communicates with model unit 254 through path 256. Path 256 provides diagnostics unit 252 with instructions concerning task constraints, such as hardware constraints, within the system and secondary goals for the task to be performed, for example conserving energy. Diagnostics unit 252 communicates with input module 240 through input path 290 and output path 295. Input path 290 provides diagnostics unit 252 with instructions as to the primary fault or faults to be monitored, for example, deviations in the speed of a wheel driven by a motor from the expected speed (because of slippage). Output path 295 provides input module 240 with feedback as to current system status and its deviation from normal behavior. The adaptive constraint problem solver program 260 is interconnected to diagnostics module 250 through paths 280 and 285. Path 285 provides adaptive constraint problem solver program 260 with the goals and constraints to be imposed on the system and information on the current state of the implementation units. Path 280 provides diagnostics unit 252 with the solution for the problem presented. Diagnostics unit 252 is interconnected to various implementation units 270 through sensor path 272. Sensor path 272 provides the diagnostics unit 252 with information as to the current state of implementation units 270.

Figure 3:
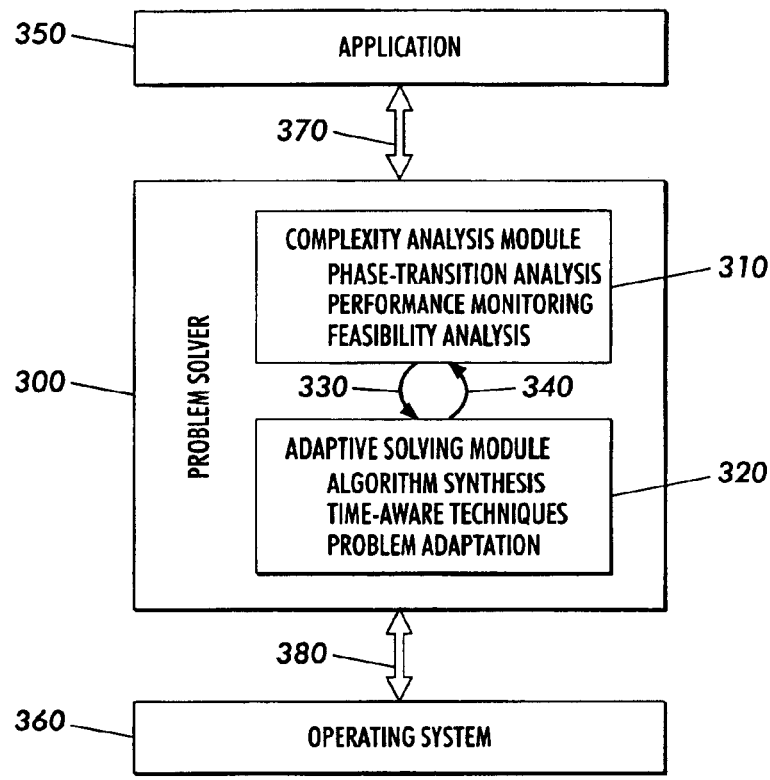
FIG. 3 is a simplified diagram of components of the problem solver.

Referring to FIG. 3, there is shown a diagrammatic overview of the components of the adaptive constraint problem solver program. Adaptive constraint problem solver program 300 includes complexity analysis module 310 and adaptive solving module 320. Path 330 and path 340 provide a dynamic feedback loop between complexity analysis and adaptive solving, to consider complexity and resources in the solver program. Within complexity analysis module 310, phase transition analysis provides easy-to-compute information about the average complexity of a given problem, which is complemented by on-line performance monitoring and off-line feasibility/worst-case analysis to guarantee solution timeliness and quality.

The average complexity of a given problem is based on problem characteristics such as the ratio of constraints to variables or average variable domain size. If the ratio of constraints to variables is much less than one, the problem is under-constrained, many solutions exist, and a solution is easy to find. If the ratio of constraints to variables is much greater than one, the problem is over-constrained, and it often is easy to show that no solution exists. The difficult problems exist between these two extremes. In principle, it may be possible to use such information to choose solver algorithms and heuristics that have been shown to perform best on a characterized problem. However, it has been shown that this characterization is only correct on average, and that some problems which appear simple may be among the most difficult to solve. Therefore, it is desirable to augment off-line complexity analysis with on-line performance monitoring and problem adaptation in order to provide real-time guarantees in constraint solving.

Within adaptive solving module 320, the adaptive synthesis of global and local search algorithms provides solving efficiency for problems of varying complexities. This synthesis is supported by time-aware constraint propagation and search techniques that balance effort against expected return. These methods to adapt solver algorithms are complemented with techniques to dynamically adapt problem parameters as needed. All of the adaptation methods are based on complexity analysis results and in turn provide the analysis component with actual performance data.

Figure 4:
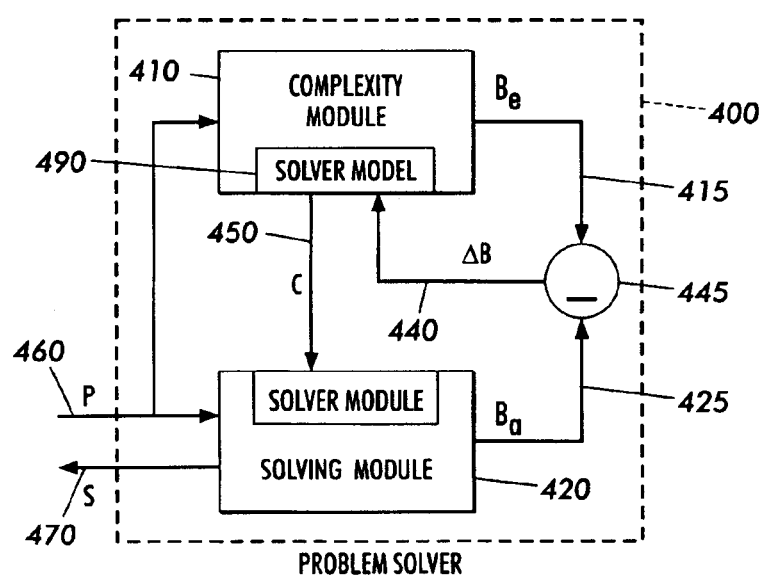
FIG. 4 is a block diagram of a problem solver in which the algorithm synthesis module resides.

Referring to FIG. 4, there is shown an embodiment of an adaptive constraint problem solver program. In this embodiment, problem P is provided to solving module 420 and complexity module 410 on path 460. The complexity-directed fine-grained, interleaved algorithm synthesis module 430 of the problem solver resides within solving module 420. Complexity module 410 includes solver model 490, which is a data structure, for example a table, which contains configuration parameters C and expected behaviors $B_e$ for different problems P. Path 450 provides solving module 420 with configuration parameters C, in any known format, for example binary or ASCII. Configuration parameters C may be based on a utility function such as minimal solving time, optimal solution quality, etc. and represent changes in algorithm decision points or adjustment of algorithm parameters. Solver behavior may be time to solution, rate of objective improvement, number of search nodes, density of local minima, solution quality, or any other desired behavior type. Solving module 420 makes choices in its algorithms that optimize the expected utility, and provide an actual behavior $B_a$ on path 425 to comparison unit 445, which compares actual behavior $B_a$ with expected behavior $B_e$, which complexity module 410 provides along path 415. Path 440 provides complexity module 410 with the difference in behavior $\Delta B$ determined by comparison unit 445, through comparison of data strings. For example, behavior may be represented as a single number (solving time so far) or an array of numbers (a history of the values of the objective function, the function being optimized), or a more complicated data structure. The comparison may simply take the difference between the expected and actual solving time values, or compute the rate change of the array of objective function values and take the difference of that from an expected value or any other desired comparison. If necessary, complexity module 410 then reconfigures the solving module 420 with new parameters C provided along path 450, and solver model 490 provides a new expected behavior $B_e$ along path 415 to comparison unit 445. For the solution of a single problem P, the behaviors $B_e$, $B_a$, and $\Delta B$ and the configuration parameters C may be sent and read multiple times during the solving process. The final problem solution is sent to applications module along path 470.

Figure 5:
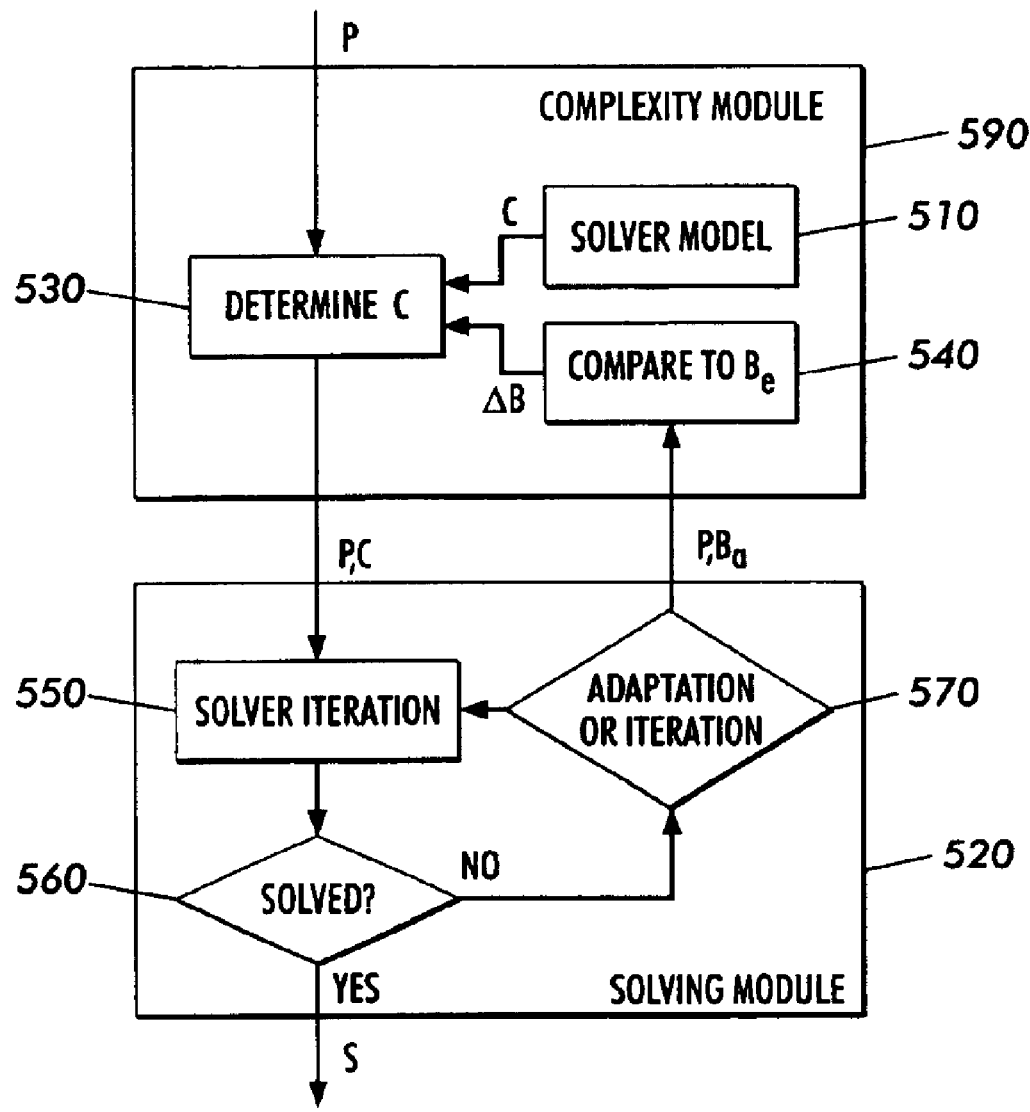
FIG. 5 is a flowchart of the problem solver of FIG. 4.

FIG. 5 illustrates a flow chart, which describes the operation of the system illustrated in FIG. 4. In FIG. 5, problem P and initial configuration parameters C, received from solver model 590, are sent to step 530, which sends the problem P and the parameters C to step 550 within solving module 520. For the purpose of illustration, parameters C may specify, among other decision points, how many individual search steps the search method in solver iteration step 550 should execute. The complexity-directed fine-grained, interleaved algorithm synthesis module code of the problem solver resides within solver iteration step 550, but for clarity is not shown. Other types of parameters and heuristics C are possible, as will be appreciated by one skilled in the art. At step 550 the solver attempts to solve the problem P. In this step, the solver code typically searches part of the search space, by using, for example, a gradient-descent, Nelder-Mead, interior-point, depth-first search, or any other technique that is intended to lead the solver towards promising regions of the search space, those regions where optimal valid solutions may be found. Step 550 depends on the type of solver or solvers used, as would be appreciated by one skilled in the art.

Once step 550 has been performed, step 560 checks the result to determine if a solution has been found, which is the case if no constraints are violated by the values of the solution and if no improvement in the objective function is found. If a valid solution has not been found, then the actual problem solver behavior is routed to step 570, where the performance so far is reviewed. Here, a decision is made as to whether another solver iteration step 550 should be executed, or whether the current status of the problem and the behavior $B_a$ should be sent to the complexity module for an adaptation step. For example, the solving module may have a fixed policy of running at least a minimum number of iterations before asking for adaptation. The actual behavior $B_a$ and expected behavior $B_e$ are compared at step 540 and resulting behavior $\Delta B$ is routed back to step 530. If the actual behavior $B_a$ and the expected behavior $B_e$ are different, parameters C are modified at step 530. For example, if the rate of improvement of the objective (specified in $B_a$) is lower than expected (specified in $B_e$), the number of individual search steps specified in C may be increased. The above process is then repeated until a solution is found.

A variety of solvers exist for constrained optimization problems, each of which perform better on some types of problems than on other problem types. No single algorithm is always better than the others in all cases. It is therefore desirable to switch between algorithms in order to utilize computing resources most effectively. Although it could be possible to have a portfolio of solvers, each working on the same problem concurrently, this approach would be wasteful of computing resources, because even though a particular algorithm has performed poorly on a past solution, it is used again for a current solution. Moreover, if one algorithm is selected from a portfolio, the selected algorithm may perform only marginally better than another algorithm. Because of the discontinuous switch in algorithms, a feedback algorithm trying to select algorithms would cause the computer to switch back and forth between algorithms, possibly yielding an oscillating solution. In such cases, the best algorithm is often a hybrid between two or more algorithms. Finally, another problem with using a portfolio of algorithms if the large amount of storage needed for all the different algorithms. This storage requirement is incompatible with the limited memory of many embedded processors.

The complexity-directed fine-grained, interleaved algorithm synthesis module of this problem solver combines various optimization algorithms into a single or a few distinct hybrid algorithms using a common parameterization. Such a parameterization provides for the continuous and smooth adaptation of the meta-algorithm between different algorithms. This parameterization is compatible with a feedback and algorithm controller that utilizes information from off-line computations, prior knowledge, previous on-line information, and current progress to adjust the meta-algorithm parameters for optimal solving. The combination using a common parameterization would require much less storage space within a processor, as the common components of each algorithm are reused.

Figure 6:
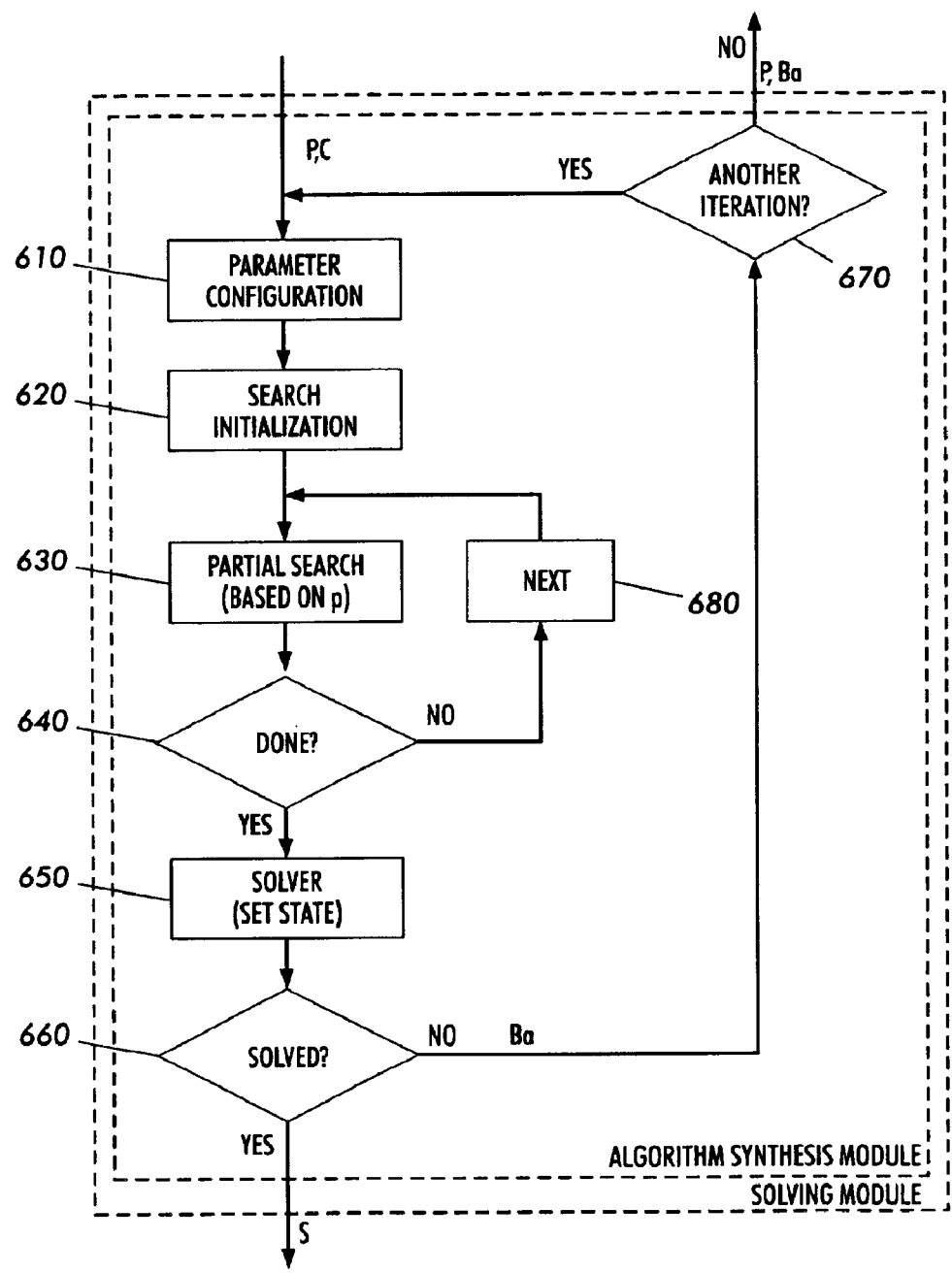
FIG. 6 is a flowchart of an embodiment of the algorithm synthesis module.

Referring now to FIG. 6, there is shown a flow chart describing the operation of an embodiment of the complexity-directed fine-grained, interleaved algorithm synthesis module. In FIG. 6, problem P and initial problem configuration parameters C, received from the complexity module are sent to step 610 within the algorithm synthesis module residing within the solving module. It should be appreciated that the core of the solver is the solver step 650. This solver step, which searches in the search space for the best point that might be a solution, generically makes use of a set of previously computed points in the search space. The calculation of these points, which are computed in steps 620 and 630, is in turn directed by a set of configuration parameter vectors, which are determined in step 610. Within step 610 a set of configuration parameter vectors is selected, discussed further hereinbelow.

For the first iteration, an initial set of default parameter vectors are selected and sent to step 620 for search initialization. Following search initialization, a partial search is performed at step 630 to compute a set of search space points before executing a solver step. This partial search step is meant to partially explore the search space and thus give a partial understanding of this space. For example, the partial search step may examine the immediate neighborhood of an initial (and possible solution) point in the search space and from that examination determine the gradient of the objective function, as may be done for constraint problems with continuous (real-valued) variables. The gradient is the difference in the function values of two points divided by their distance. As is known by those skilled in the art, by examining multiple points around a single initial point, it is possible to determine in which direction the objective function changes the fastest and therefore a possible optimal solution might be located. As another example, the partial search step may examine the points in relation to the constraints and thus identify regions where the constraints are not violated. In yet another example, the partial search step may select a set of undetermined (open) variables of a partial solution, perhaps those variables with the smallest number of possible values or participating in the largest number of constraints, as may be done for constraint problems with discrete variables. Which kind of partial search step 630 should be performed is determined by the parameters which have been set in step 610.

The set of search space points is reviewed at step 640. If a complete set of search space points has been calculated, then a solver step is executed at step 650. If the set of search space points is incomplete, then step 680 instructs step 630 to perform another partial search step. In one example, step 680 may request that a fixed number of partial search steps are performed. In another example, step 680 may request that the points generated in step 630 satisfy a certain criterion, such as all being a certain distance away from the initial point, or all being lower in their objective function value than the initial point, or being mostly in a feasible region of the search space, or satisfying some heuristic such as violating the minimum number of constraints. Step 650 then performs a full search step based on the information computed in steps 630. For example, step 650 may calculate a new possible solution point that lies in the most promising direction from the previous initial point as determined by step 630, and for discrete constraint problems, step 650 may calculate a new partial solution with one more variable set to a fixed value, where the variable and value are the most promising as determined by step 630.

Once step 650 has been performed, step 660 checks the result to determine if a solution has been found, which is the case if no constraints are violated by the values of the solution and if no improvement in the objective function is found. If a valid solution has not been found, then the actual problem solver behavior $B_a$ is routed to step 670, where the performance so far is reviewed. Here, a decision is made as to whether another algorithm synthesis iteration should be executed, or whether the current status of the problem and the behavior $B_a$ should be sent to the complexity module code for an adaptation step. If another iteration should be performed, the possible or partial solution typically becomes the new initial point or partial solution for the next iteration. Also, in subsequent executions of step 610, new parameters may be selected.

It should be appreciated that the parameters direct the partial search step 630 and thus influence the quality of the full search step 650. If it is determined that different parameter values might lead to a better solution or to a solution faster, then step 610 will compute a different parameter set. This in turn will change the exploration behavior of the solver in partial search step 630 and the search behavior in step 650. Together, these emulate different known solver methods based on different parameter settings. For example, the parameters may include components to direct deterministic and random search and to determine how many partial search steps 630 should be executed. As indicated in the description of step 630, if the deterministic parameters are used, if points are examined at small distances, and if exactly as many steps 630 are performed as there are variables in the constraint problem (all directed by the configuration parameters), steps 630 compute the gradient and steps 630 together with step 650 emulate a local gradient-based solver. As another example, if points are examined at larger distances in a particular simplex pattern (again directed by the configuration parameters), steps 630 compute a simplex and steps 630 together with step 650 emulate a Nelder-Mead solver. As another example, if instead the random parameter components are used, the steps can emulate random search.

Figure 7:
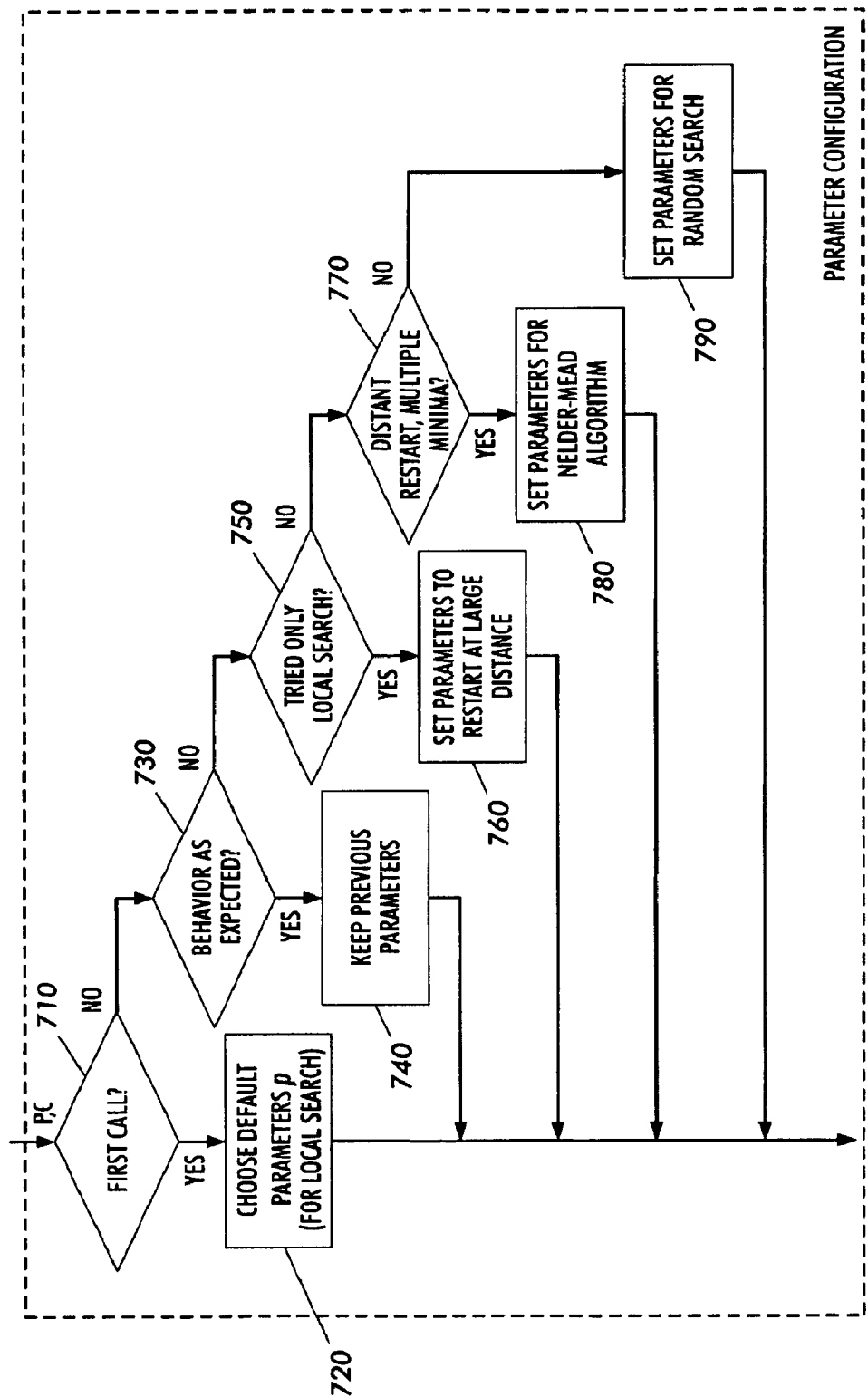
FIG. 7 is a flowchart of an embodiment of the configuration parameter code module of FIG. 6.

Referring now to FIGS. 6 and 7, FIG. 7 is a flow chart of one embodiment of the steps taken within the configuration parameter vector code presented in FIG. 6 at step 610 to produce a fine-grained, interleaved synthesis of algorithms within the algorithm synthesis module code. Problem P and initial problem configuration parameters C, received from the complexity module are sent to step 710 within the configuration parameter vector code residing within the algorithm synthesis module. At step 710 a determination is made as to whether this is an initial attempt to solve for configuration parameter vectors for the specified problem. If it is an initial attempt, default parameter vectors are selected at step 720, in the example of a local search, and the parameter vectors are sent to step 620 of FIG. 6 for search initialization and solution of the problem. A local search is performed with a loose termination criterion to approximately (and quickly) find a minimum of a simple model of a function near an initial point. On subsequent calls to step 610 in FIG. 6, alternative paths through the sample flow chart in FIG. 7 may be taken. At step 730 the behavior is evaluated. If the behavior is as predicted, then a decision is made at step 740 to retain the previous parameters, which are then sent to step 620 of FIG. 6. If the search fails to improve faster than expected (based on the complexity models), the problem solver identifies at step 750 whether only local searches have been performed. If only local searches have been performed, then at step 760 another point is selected at a distance far removed from the first point and another attempt is made to solve the problem. The local solver is used to determine a second nearby minimum. If this minimum is nearly the same as the first, the problem solver concludes that the function is simple and that the local solver yields the best results. However, if the minima are not the same, then on a subsequent call at step 770 the minima may be used as the starting simplex for a Nelder-Mead algorithm. The parameters for the Nelder-Mead algorithm are set in step 780. At each point selected by the Nelder-Mead algorithm, a local search is made for the best nearby minimum. Nelder-Mead and the local solver handle global and local search, respectively. If the Nelder-Mead algorithm has trouble discovering the global structure, then on a subsequent call at step 790 parameters are set for a random search, for example, a search based on force-directed simulating annealing to generate better Nelder-Mead simplexes. Ultimately, if the function is very complex, the global search takes only stochastic steps with interleaved local searches. Such a hybrid, interleaved solver does much better than either algorithm separately. The transitions between local and global, between various local strategies, and between various global strategies can be made based on complexity and performance measures.

This hybrid approach also applies to discrete problems. In general, the algorithm synthesis involves several choices: the selection of heuristics that control local or depth-first searches, a group of exception or global heuristics, and strategies for dynamically switching between the local and global heuristics. It is also possible to use various adaptive strategies for simulated annealing schedules that modify the annealing schedule based on the results. The strategies involve comparisons of the rate of improvement per function evaluation to decide what is most likely the best next point to look for minima.

Figure 8:
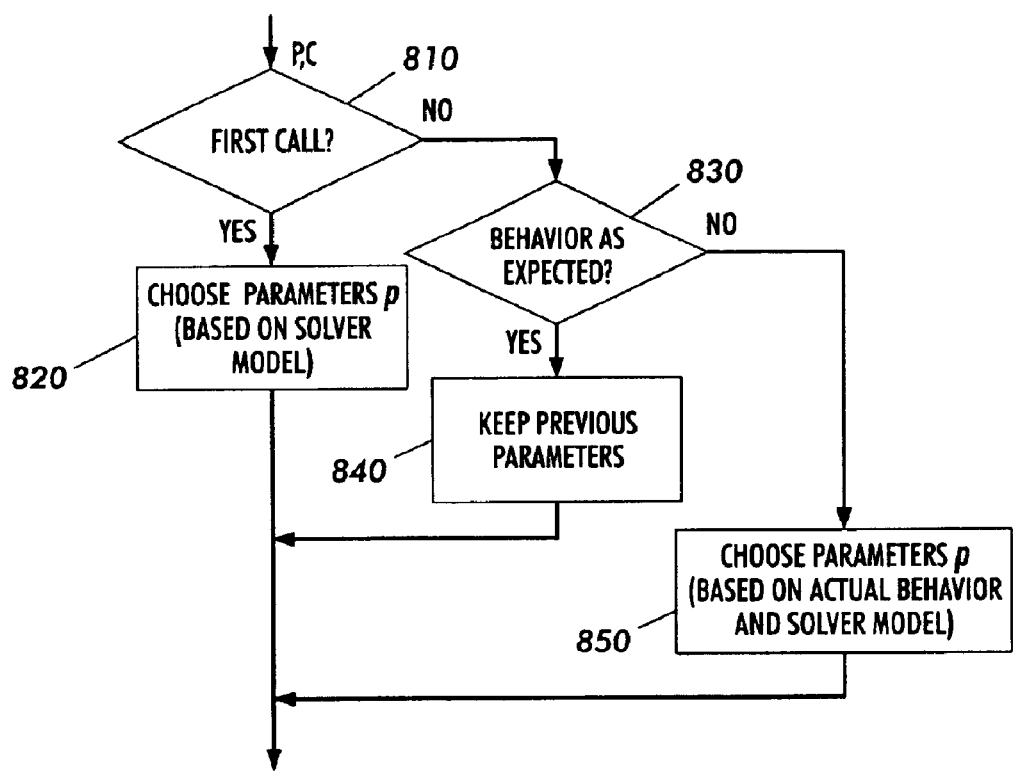
FIG. 8 is a flowchart of another embodiment of the configuration parameter code module.

Referring now to FIGS. 6 and 8, FIG. 8 is a flow chart of an alternate embodiment of the steps taken within the configuration parameter vector code presented in FIG. 6 at step 610 to produce a fine-grained, interleaved synthesis of algorithms within the algorithm synthesis module. Problem P and initial problem configuration parameters C, received from the complexity module, are sent to step 810 within the configuration parameter vector code residing within the algorithm synthesis module. At step 810 a determination is made as to whether this is an initial attempt to solve for configuration parameter vectors for the specified problem. If it is an initial attempt, default parameter vectors are selected at step 820 for a local search and the parameter vectors are sent to step 620 of FIG. 6 for search initialization and solution of the problem. A local search is performed with a loose termination criterion to approximately (and quickly) find a minimum of a simple model of a function near an initial point. At step 830 the behavior is evaluated. If the behavior is as predicted, a decision is made at step 840 to retain the configuration parameters, which are then sent to step 620 of FIG. 6. If the search fails to improve faster than expected (based on the complexity models), then at step 850 revised parameter vectors based on actual behavior and the original problem statement and configuration parameters provided by the complexity module are selected and another attempt is made to solve the problem.

Figure 9:
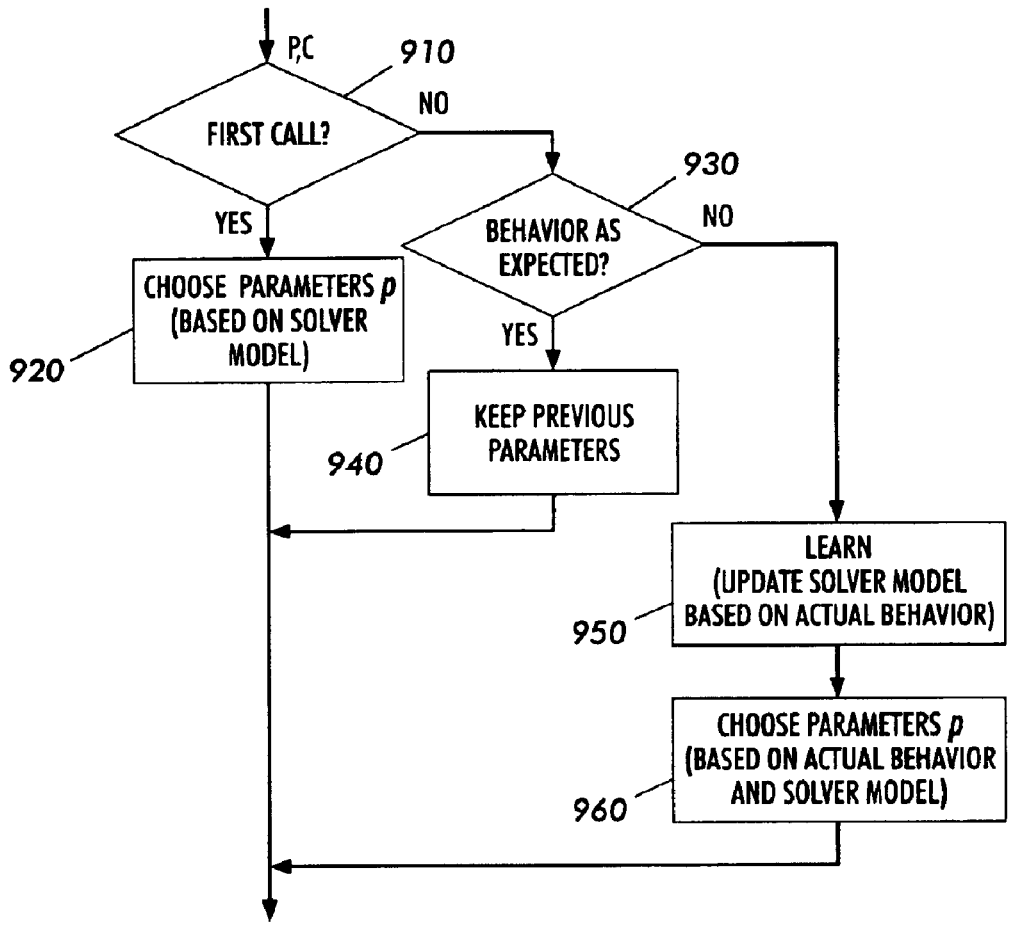
FIG. 9 is a flowchart of an alternate embodiment of the configuration parameter code module.

Referring now to FIGS. 6 and 9, FIG. 9 is a flow chart of an alternate embodiment of the steps taken within the configuration parameter vector code presented in FIG. 6 at step 610 to produce a fine-grained, interleaved synthesis of algorithms within the algorithm synthesis module, with the added capability of learning. Problem P and initial problem configuration parameters C, received from the complexity module, are sent to step 910 within the configuration parameter vector code residing within the algorithm synthesis module. At step 910 a determination is made as to whether this is an initial attempt to solve for configuration parameter vectors for the specified problem. If it is an initial attempt, default parameter vectors are selected at step 920 for a local search and the parameter vectors are sent to step 620 of FIG. 6 for search initialization and solution of the problem. A local search is performed with a loose termination criterion to approximately (and quickly) find a minimum of a simple model of a function near an initial point. At step 930 the behavior is evaluated. If the behavior is as predicted, a decision is made at step 940 to retain the configuration parameters, which are then sent to step 620 of FIG. 6. If the search fails to improve faster than expected (based on the complexity models), then at learning step 950 the solver model residing within the complexity module is updated based on actual behavior. For example, the difference may be used to refine the control parameters provided by the solver model. In one of many possible cases, if the rate of improvement of the objective is lower than expected, it may be recorded in the solver model that in the future all problems similar to the current problem should be solved with an increased number of individual search steps, or that a particular search method such as Nelder-Mead should be tried first instead of the default local search. This learning step depends on the type of parameter to be learned. Possible learning methods include value replacement, reinforcement learning, and any others known in the art. New parameter vectors based on the revised solver model configuration parameters provided by the complexity module are selected and another attempt is made to solve the problem.

While the present problem solver has been illustrated and described with reference to specific embodiments, further modification and improvements will occur to those skilled in the art. For example, any of the embodiments described herein could perform their desired function without the presence of on-line adaptation, the comparison of expected behavior with actual behavior. Additionally, "code" as used herein, or "program" as used herein, is any plurality of binary values or any executable, interpreted or compiled code which can be used by a computer or execution device to perform a task. This code or program can be written in any one of several known computer languages. A "computer", as used herein, can mean any device which stores, processes, routes, manipulates, or performs like operation on data. It is to be understood, therefore, that this problem solver is not limited to the particular forms illustrated and that it is intended in the appended claims to embrace all alternatives, modifications, and variations which do not depart from the spirit and scope of this invention.

What is claimed is:

1. A problem solving method for use in a computer system, wherein the computer system includes an applications module having a problem solver, wherein the problem solver comprises a solving module and a complexity module, the method comprising:

receiving a problem statement from the applications module;

predicting an expected problem solver behavior associated with configuration parameters for said problem statement;

providing the solving module with said configuration parameters;

selecting a set of configuration parameter vectors;

determining a set of search space points;

perform a partial search with said configuration parameter vectors;

determining actual solver behavior;

reviewing said actual solver behavior incrementally to determine if a problem solution has been found, wherein reviewing comprises comparing said expected solver behavior with said actual solver behavior;

determining whether to perform a solver iteration step or to request the complexity module to perform an adaptation step if a problem solution has not been found, wherein said complexity module includes means for detecting problem complexity, means for estimating rate of improvement bounds, and means for selecting a complexity related action, wherein said complexity related action comprises selecting at least one member from the group consisting of returning an error, accepting the best result possible for fixed computational resources, adding computational resources, and changing the problem statement;

performing a said solver iteration step when said solver iteration step is selected, comprising the steps of determining new actual solver behavior and determining whether to repeat said solver iteration step;

repeating said solver iteration step until said adaptation step is selected;

comparing said actual solver behavior with said expected solver behavior when said adaptation step is selected;

requesting the complexity module to perform said adaptation step;

performing said adaptation step, comprising the steps of modifying said configuration parameters within the complexity module, configuring the solving module with said modified configuration parameters, determining expected solver behavior associated with said modified configuration parameters for said problem statement, selecting an algorithm to calculate a revised problem solution, determining a revised actual solver behavior associated with said modified configuration parameters for said problem statement, reviewing said revised actual solver behavior to determine if a problem solution has been found, determining whether to perform said solver iteration step or to request the complexity module to perform another adaptation step if a problem solution has not been found, and repeating said iteration step until said adaptation step is selected;

repeating said adaptation step until a problem solution is found; and providing the solution to the applications module.

2. The problem solving method according to claim 1, further comprising the step of selecting an algorithm to calculate an initial problem solution.

3. The problem solving method according to claim 1, further comprising the step of refining the configuration parameters provided to the solving model.

4. The problem solving method according to claim 1, wherein the problem solver comprises an adaptive constraint problem solver.

5. The problem solving method according to claim 1, further comprising the step of transforming said problem statement after receiving said problem statement from the applications module.

6. The problem solving method according to claim 1, wherein said configuration parameters include problem configuration parameters and solver configuration parameters.

7. The problem solving method according to claim 6, further comprising the step of transforming said problem configuration parameters before providing said problem configuration parameters to the solving module.

8. The problem solving method according to claim 1, wherein the step of selecting a set of configuration parameter vectors further comprises:

choosing a set of default configuration parameter vectors;

selecting an initial minimum point;

performing a local search;

evaluating actual behavior to determine whether to repeat a local search or select a different solver algorithm;

repeating a local search with a second minimum point when the step of repeating a local search is selected; and revising the set of configuration parameter vectors for each search performed.

9. A computer system for problem solving, the system having implementation units communicating with the computer system, the system comprising:

an input device for providing the problem statement;

a computer coupled to the output of said input device;

a memory portion coupled to the computer comprising:

software for receiving the problem statement from said input device;

software for determining solver configuration parameter vectors;

software for configuring a problem solver, wherein said problem solver includes a solving module and a complexity module, wherein said complexity module includes means for detecting problem complexity, means for estimating rate of improvement bounds, and means for selecting a complexity related action, wherein said complexity related action comprises selecting at least one member from the group consisting of returning an error, accepting the best result possible for fixed computational resources, adding computational resources, and changing the problem statement;

software for predicting expected solver behavior;

software for performing a partial search with said configuration parameter vectors;

software for determining actual solver behavior and incrementally determining whether a solution has been found, wherein determining whether a solution has been found comprises comparing said expected solver behavior and said actual solver behavior;

software for determining whether to perform a solver iteration step or to perform an adaptation step; and software for performing an adaptation step, comprising modifying said configuration parameters and reconfiguring said problem solver; and output means for providing a solution statement.

10. The computer system for problem solving according to claim 9, wherein said problem solver comprises an adaptive constraint problem solver.

11. The computer system for problem solving according to claim 9, wherein said memory portion further comprises software including a learning module for refining said expected problem solver behavior.

12. The computer system for problem solving according to claim 9, further comprising a problem transformer module for transforming said problem statement after receiving said problem statement from said input device.

13. The computer system for problem solving according to claim 9, wherein said configuration parameters include problem configuration parameters and solver configuration parameters.

14. The computer system for problem solving according to claim 13, further comprising a problem transformer module for transforming said problem configuration parameters before providing said problem configuration parameters to said solving module.

15. The computer system for problem solving according to claim 9, wherein said software for determining expected solver behavior comprises a data structure, said data structure containing configuration parameters and expected behaviors for a plurality of problem types.

16. The computer system for problem solving according to claim 9, wherein the computer includes an embedded computer.

17. The computer system for problem solving according to claim 16, wherein said embedded computer system controls at least one operation within a copier or printer.

18. The computer system for problem solving according to claim 16, wherein said embedded computer system controls at least one operation within a process control system.

19. The computer system for problem solving according to claim 16, wherein said embedded computer system controls at least one operation within a diagnostics unit.

20. A computer system for problem solving, the system having implementation units communicating with the computer system, the system comprising:

an input device for providing the primary goal for the task to be performed;

a computer coupled to the output of said input device;

a memory portion coupled to said computer comprising:

a complexity module for configuring a problem statement and predicting expected solver behavior, wherein said complexity module includes means for detecting problem complexity, means for estimating rate of improvement bounds, and means for selecting a complexity related action, wherein said complexity related action comprises selecting at least one member from the group consisting of returning an error, accepting the best result possible for fixed computational resources, adding computational resources, and changing the problem statement;

a controllable solving module coupled to said complexity module for determining actual solver behavior;

a synthesis module for determining configuration parameter vectors; and comparison means for comparing said actual solver behavior with said expected solver behavior and determining whether a problem solution has been found; and output means for providing a statement of the problem solution.

21. The computer system for problem solving according to claim 20, wherein said problem solver comprises an adaptive constraint problem solver.

22. The computer system for problem solving according to claim 20, further comprising a learning module.

23. The computer system for problem solving according to claim 20, further comprising a problem transformer module for transforming said problem statement after receiving said problem statement from said input device.

24. The computer system for problem solving according to claim 20, wherein said configuration parameters include problem configuration parameters and solver configuration parameters.

25. The computer system for problem solving according to claim 24, further comprising a problem transformer module for transforming said problem configuration parameters before providing said problem configuration parameters to said solving module.

26. The computer system for problem solving according to claim 20, wherein said complexity module comprises a data structure, said data structure containing configuration parameters and expected behaviors for a plurality of problem types.

27. The computer system for problem solving according to claim 20, wherein said control computer comprises an embedded computer system.

28. The computer system for problem solving according to claim 27, wherein said embedded computer system controls at least one operation within a copier or printer.

29. The computer system for problem solving according to claim 27, wherein said embedded computer system controls at least one operation within a process control system.

30. The computer system for problem solving according to claim 27, wherein said embedded computer system controls at least one operation within a diagnostics unit.

31. A problem solver in the form of a program to be run on a computer system, said problem salver comprising:

means for receiving a problem statement;

means for detecting problem complexity;

means for estimating rate of improvement bounds;

means for selecting a complexity related action, wherein said complexity related action comprises selecting at least one member from the group consisting of returning an error, accepting the best result possible for fixed computational resources, adding computational resources, and changing the problem statement;

means for predicting expected solver behavior associated with said problem statement;

means for providing configuration parameters for a plurality of problems;

means for determining a set of configuration parameter vectors;

means for performing a partial search with said configuration parameter vectors;

means for calculating actual solver behavior;

means for reviewing said actual solver behavior incrementally to determine if a problem solution has been found, wherein reviewing comprises comparing said expected solver behavior to said actual solver behavior;

means for determining whether to perform a solver iteration step or to request an adaptation step if a problem solution has not been found;

means for performing a solver iteration step, comprising performing another search step, calculating a revised actual solver behavior and determining whether to repeat said solver iteration step;

means for comparing said actual solver behavior with said expected solver behavior;

means for requesting performance of an adaptation step;

means for performing an adaptation step, comprising modifying said configuration parameters, determining a revised expected problem solver behavior, and providing said modified configuration parameters and said revised expected problem solver behavior to said means for performing a solver iteration step; and means for providing the problem solution to an output device.

32. A problem solving method in the form of a program to be run on a computer system comprising:

receiving a problem statement;

means for detecting problem complexity;

configuring a problem solver with configuration parameters;

determining a set of configuration parameter vectors;

predicting expected solver behavior associated with said configuration parameters for said problem statement;

searching for a solution with said configuration parameter vectors;

determining actual solver behavior;

means for estimating rate of improvement bounds;

determining if a problem solution has been found, comprising comparing said expected solver behavior with said actual solver behavior incrementally;

means for selecting a complexity related action, wherein said complexity related action comprises selecting at least one member from the group consisting of returning an error, accepting the best result possible for fixed computational resources, adding computational resources, and changing the problem statement;

determining whether to perform a solving iteration step or an adaptation step if a problem solution has not been found;

performing said solver iteration step, when said solver iteration step is selected, comprising the steps of determining a new actual solver behavior and determining whether to repeat said iteration step;

repeating said solver iteration step until said adaptation step is selected;

comparing said actual solver behavior with said expected solver behavior when said adaptation step is selected;

performing said adaptation step, comprising the steps of modifying said configuration parameters, determining expected solver behavior associated with said modified configuration parameters, determining a revised actual solver behavior, reviewing said revised actual solver behavior to determine if a problem solution has been found, determining whether to perform said solver iteration step or to perform another adaptation step if a problem solution has not been found, and repeating said iteration step until said adaptation step is selected;

repeating said adaptation step until a problem solution is found; and transmitting a solution statement.

33. The problem solving method according to claim 32, wherein said problem solving method comprises an adaptive constraint problem solving method.

34. The problem solving method according to claim 32, further comprising the step of refining the configuration parameters.

35. The problem solving method according to claim 32, further comprising the step of transforming said problem statement.

36. The problem solving method according to claim 32, wherein said configuration parameters include problem configuration parameters and solver configuration parameters.

37. The problem solving method according to claim 36, further comprising the step of transforming said problem configuration parameters.

38. The problem solving method according to claim 32, wherein the step of determining a set of configuration parameter vectors further comprises:

choosing a set of default configuration parameter vectors;

selecting an initial minimum point;

performing a local search;

evaluating actual behavior to determine whether to repeat a local search or select a different solver algorithm;

repeating a local search with a second minimum point when the step of repeating a local search is selected; and revising the set of configuration parameter vectors for each search performed.

39. The problem solving method according to claim 32, further comprising the step of selecting an algorithm for calculating a problem solution.

40. An article of manufacture comprising a computer usable medium having computer readable program code embodied in said medium which, when said program code is executed by said computer causes said computer to perform method steps for problem solving for use in a computer system, wherein the problem solver includes a solving module and a complexity module, said method comprising:

receiving a problem statement from the applications module;

predicting an expected problem solver behavior associated with configuration parameters for said problem statement;

providing the solving module with said configuration parameters;

selecting a set of configuration parameter vectors;

determining a set of search space points;

perform a partial search with said configuration parameter vectors;

determining actual solver behavior;

reviewing said actual solver behavior incrementally to determine if a problem solution has been found, wherein reviewing comprises comparing said expected solver behavior with said actual solver behavior;

determining whether to perform a solver iteration step or to request the complexity module to perform an adaptation step if a problem solution has not been found, wherein said complexity module includes means for detecting problem complexity, means for estimating rate of improvement bounds, and means for selecting a complexity related action, wherein said complexity related action comprises selecting at least one member from the group consisting of returning an error, accepting the best result possible for fixed computational resources, adding computational resources, and changing the problem statement;

performing a said solver iteration step when said solver iteration step is selected, comprising the steps of determining new actual solver behavior and determining whether to repeat said solver iteration step;

repeating said solver iteration step until said adaptation step is selected;

comparing said actual solver behavior with said expected solver behavior when said adaptation step is selected;

requesting the complexity module to perform said adaptation step;

performing said adaptation step, comprising the steps of modifying said configuration parameters within the complexity module, configuring the solving module with said modified configuration parameters, determining expected solver behavior associated with said modified configuration parameters for said problem statement, selecting an algorithm to calculate a revised problem solution, determining a revised actual solver behavior associated with said modified configuration parameters for said problem statement, reviewing said revised actual solver behavior to determine if a problem solution has been found, determining whether to perform said solver iteration step or to request the complexity module to perform another adaptation step if a problem solution has not been found, and repeating said iteration step until said adaptation step is selected;

repeating said adaptation step until a problem solution is found; and providing the solution to the applications module.

* * * * *